United States Patent [19]
Molle

[11] Patent Number: 5,978,383
[45] Date of Patent: *Nov. 2, 1999

[54] REPEATERS FOR REDUCING COLLISIONS IN AN ETHERNET NETWORK

[75] Inventor: Mart L. Molle, Riverside, Calif.

[73] Assignee: The Regents of the University of California, Oakland, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/613,869

[22] Filed: Mar. 11, 1996

[51] Int. Cl.$^6$ .................................................... H04J 3/02
[52] U.S. Cl. .......................................................... 370/445
[58] Field of Search ..................... 370/85.1, 85.2, 370/85.3, 85.6, 85.13, 110.1, 13.1, 76, 77, 256, 444, 445, 446, 447, 448, 449, 451, 454, 456, 461, 462, 501, 503, 279, 401; 455/11.1; 375/211; 340/825.08

[56] References Cited

U.S. PATENT DOCUMENTS

| | | | |
|---|---|---|---|
| 4,063,220 | 12/1977 | Metcalfe et al. | 340/147 |
| 5,293,375 | 3/1994 | Moorwood et al. | 370/445 |
| 5,396,495 | 3/1995 | Moorwood et al. | 370/85.11 |
| 5,430,726 | 7/1995 | Moorwood et al. | 370/85.11 |
| 5,450,404 | 9/1995 | Koopman et al. | 370/85.2 |
| 5,737,525 | 4/1998 | Picazo | 370/351 |

OTHER PUBLICATIONS

ANSI/IEE Std. 802.3, 1993 Edition, pp. 45–69, 1993.
IEEE Std. 802.3u–1995, Institute of Electrical and Electronic Engineers, New York, pp. 203–220, 1995.
P. Kermani, "Switching and Flow Control Techniques in Computer Communication Networks", pp. 14–19, School of Engineers and Applied Science, University of California, Los Angeles, California, Feb. 1978.
J. Martin, *Local Area Networks*, pp. 303–315, Prentice Hall, Inc., New Jersey, 1994.
R. Seifert, "Issues in LAN Switching and Migration from a Shared LAN Environment", pp. 1–26, Networks and Communications Consulting, Los Gatos, California, Nov. 1995.

*Primary Examiner*—Dang Ton
*Attorney, Agent, or Firm*—Fish & Richardson P.C.

[57] ABSTRACT

An IEEE 802.3 CSMA-CD local area network is arranged with point-to-point links between hosts and repeaters. The devices, whether hosts or repeaters, can ignore a portion of an incoming signal following a collision in order to improve the efficiency of the network. Each device includes a filter to mask the presence of the incoming signal from a consumer, e.g., the MAC sublayer of a network interface or the core of a repeater. If the incoming signal is masked, the devices may transmit an outgoing signal.

25 Claims, 13 Drawing Sheets

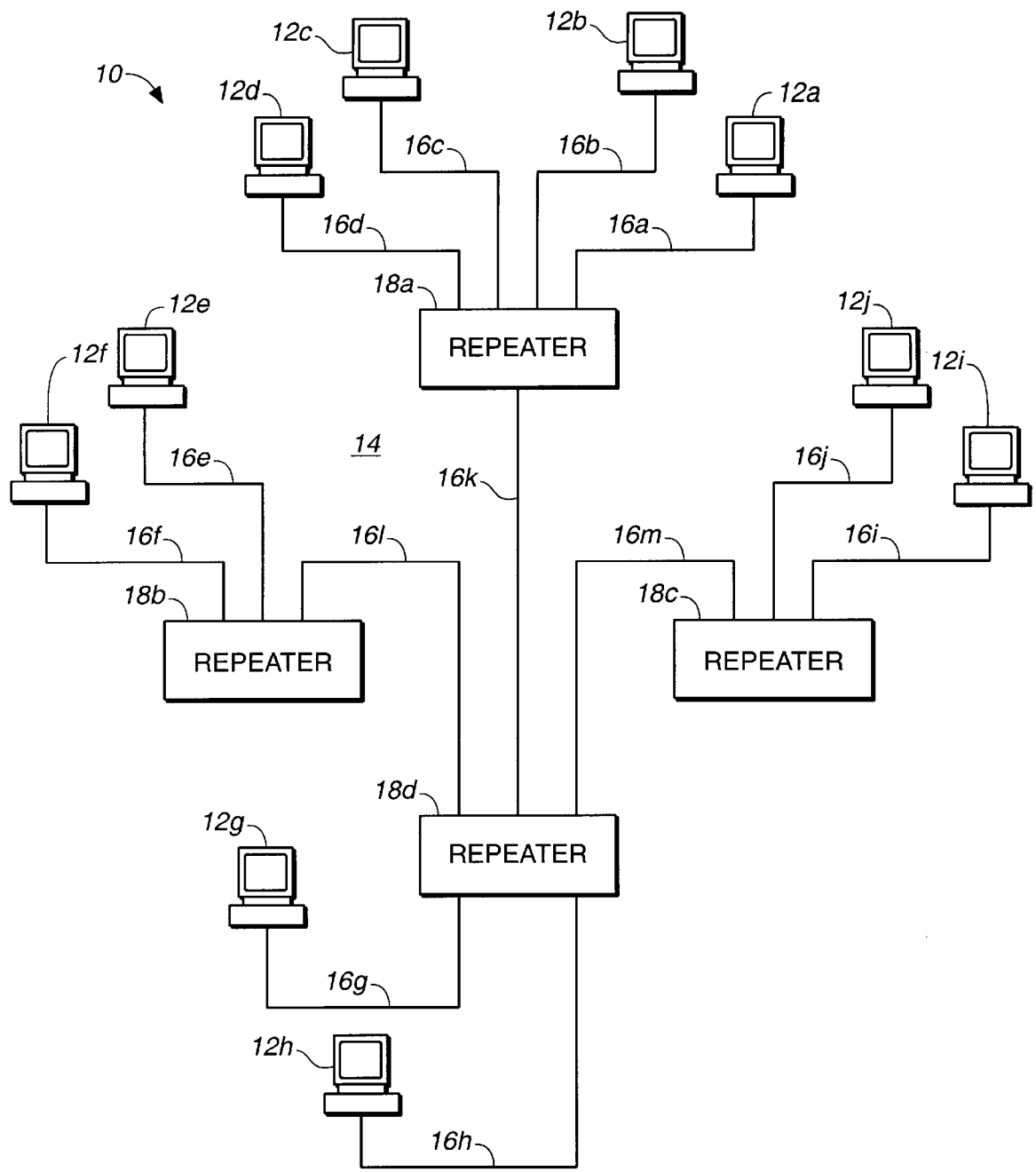
FIG._1

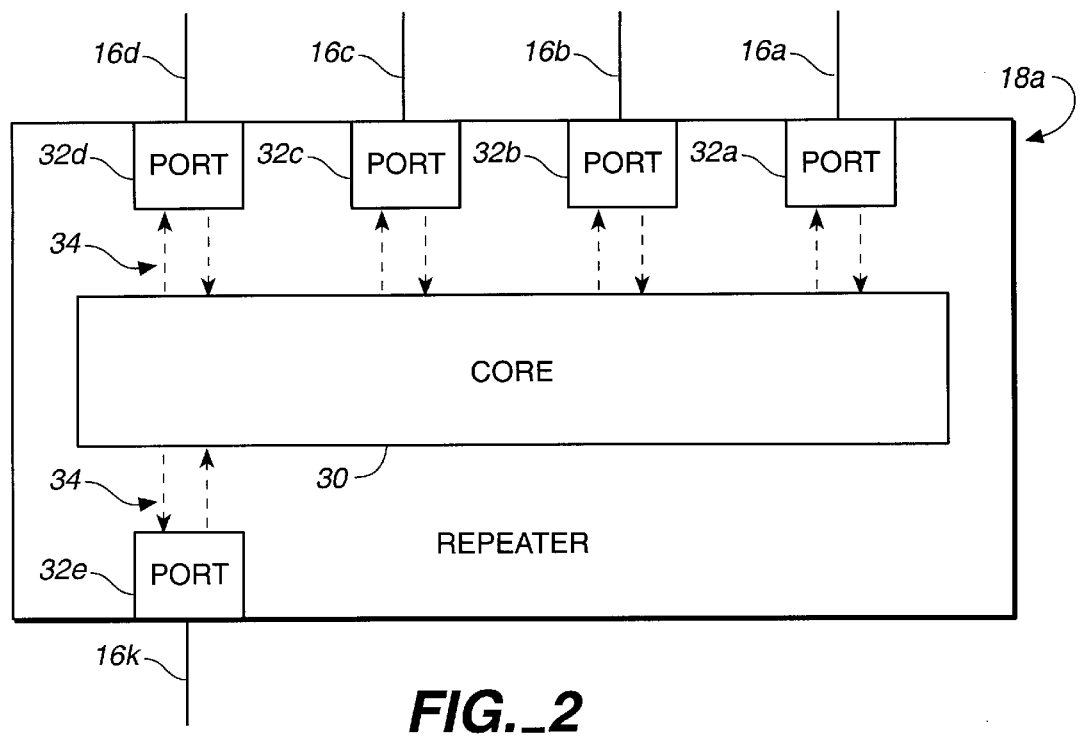
FIG._2
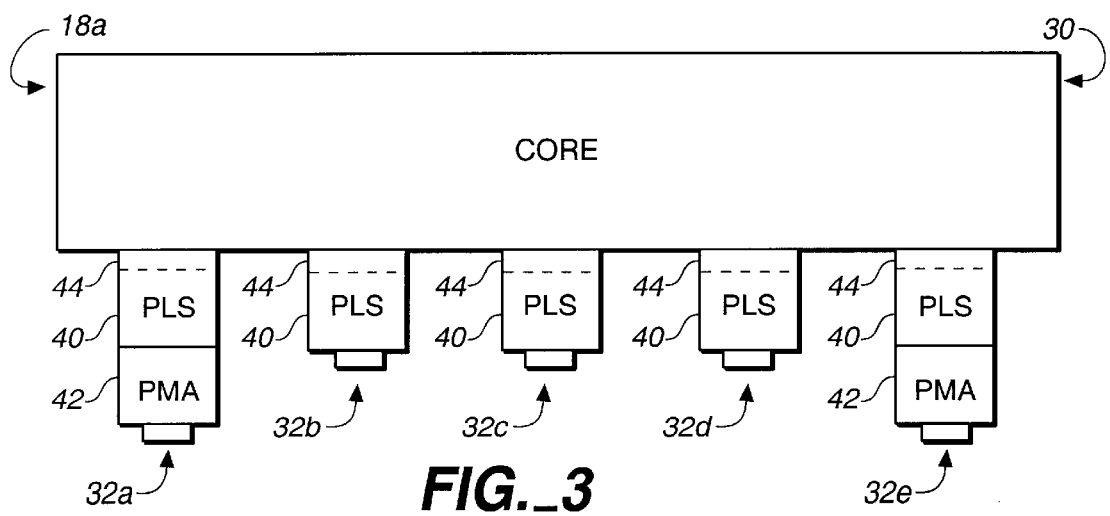
FIG._3

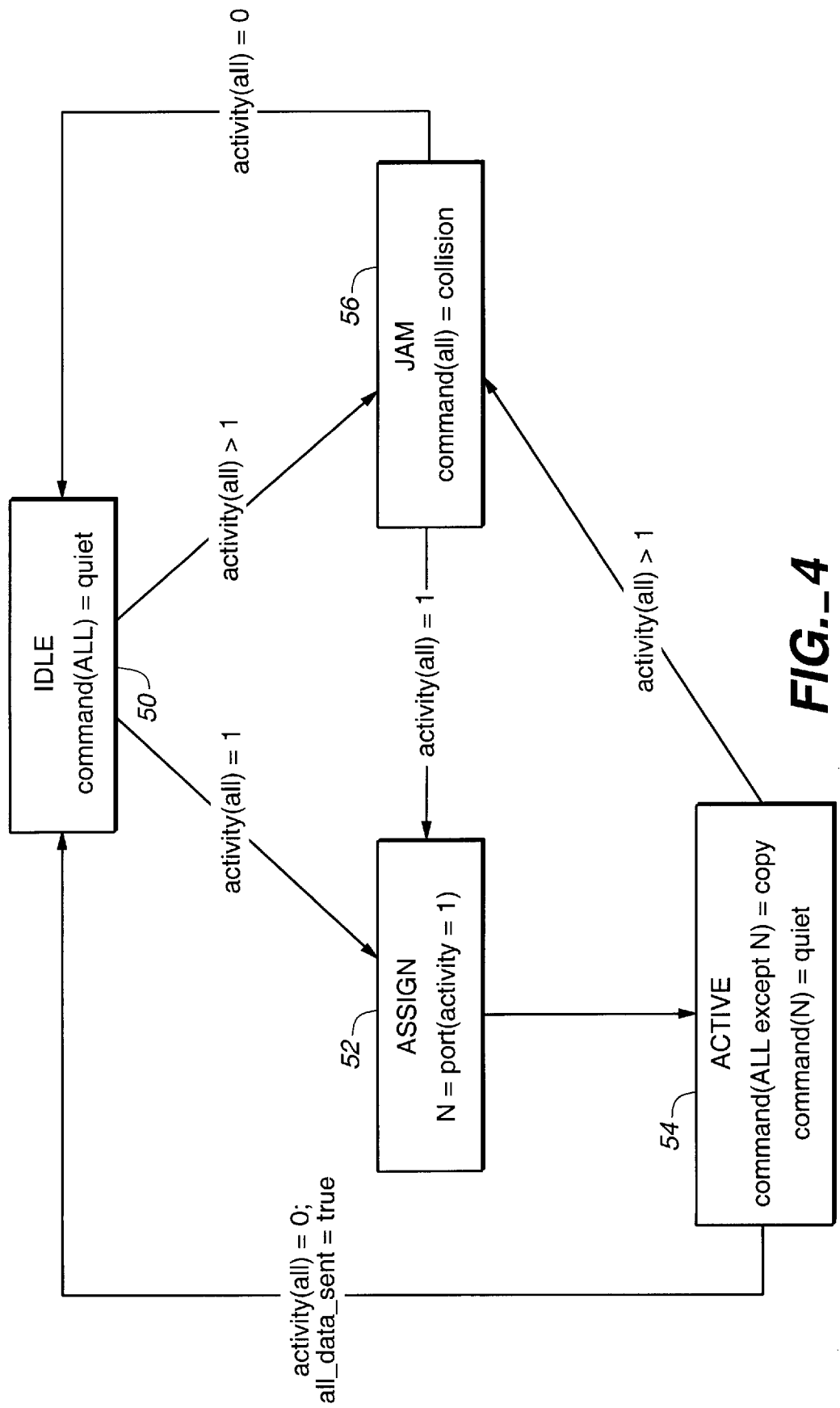
FIG._4

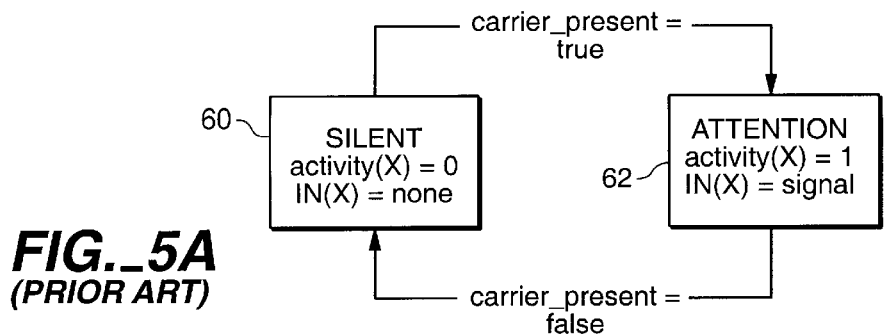
FIG._5A
*(PRIOR ART)*
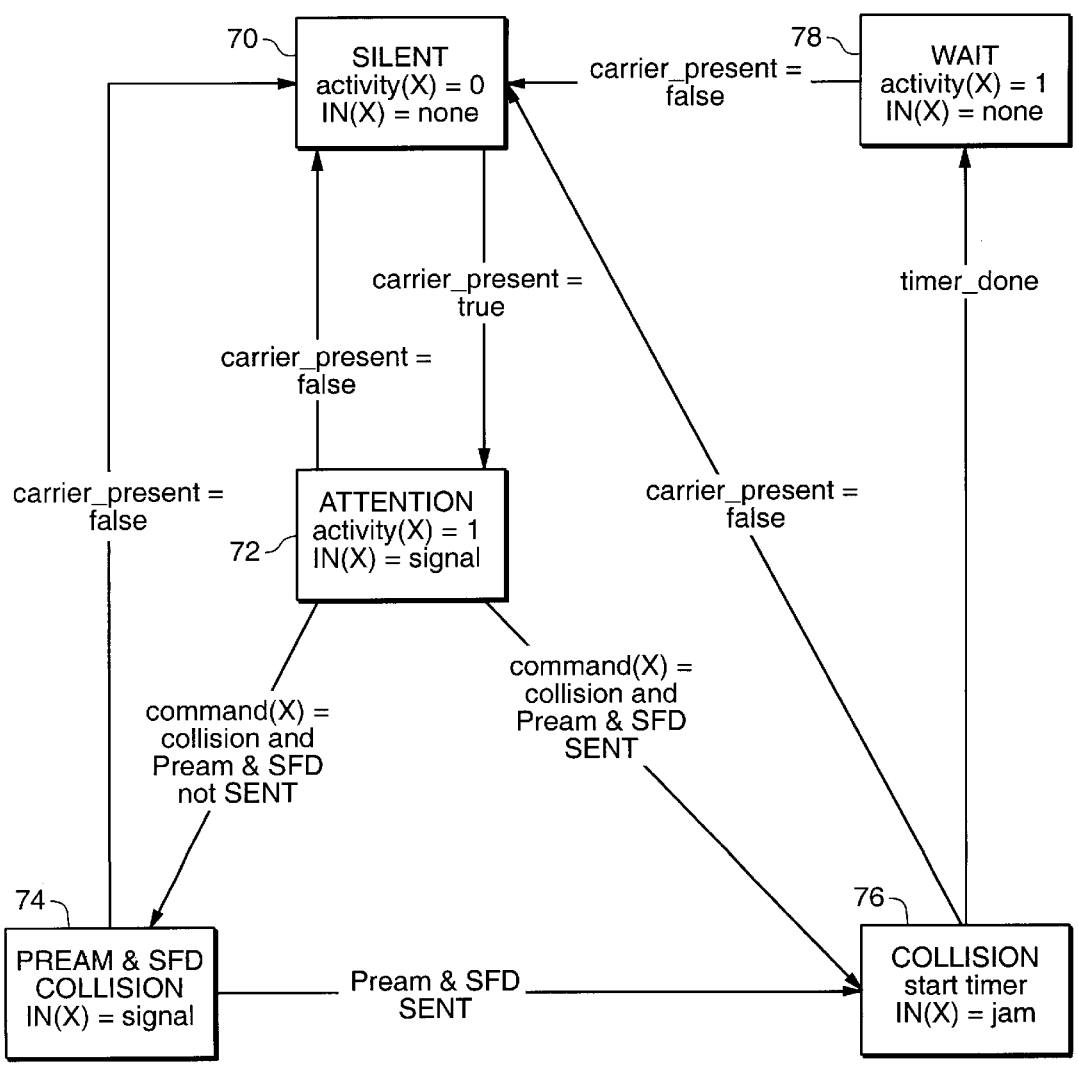
FIG._5B

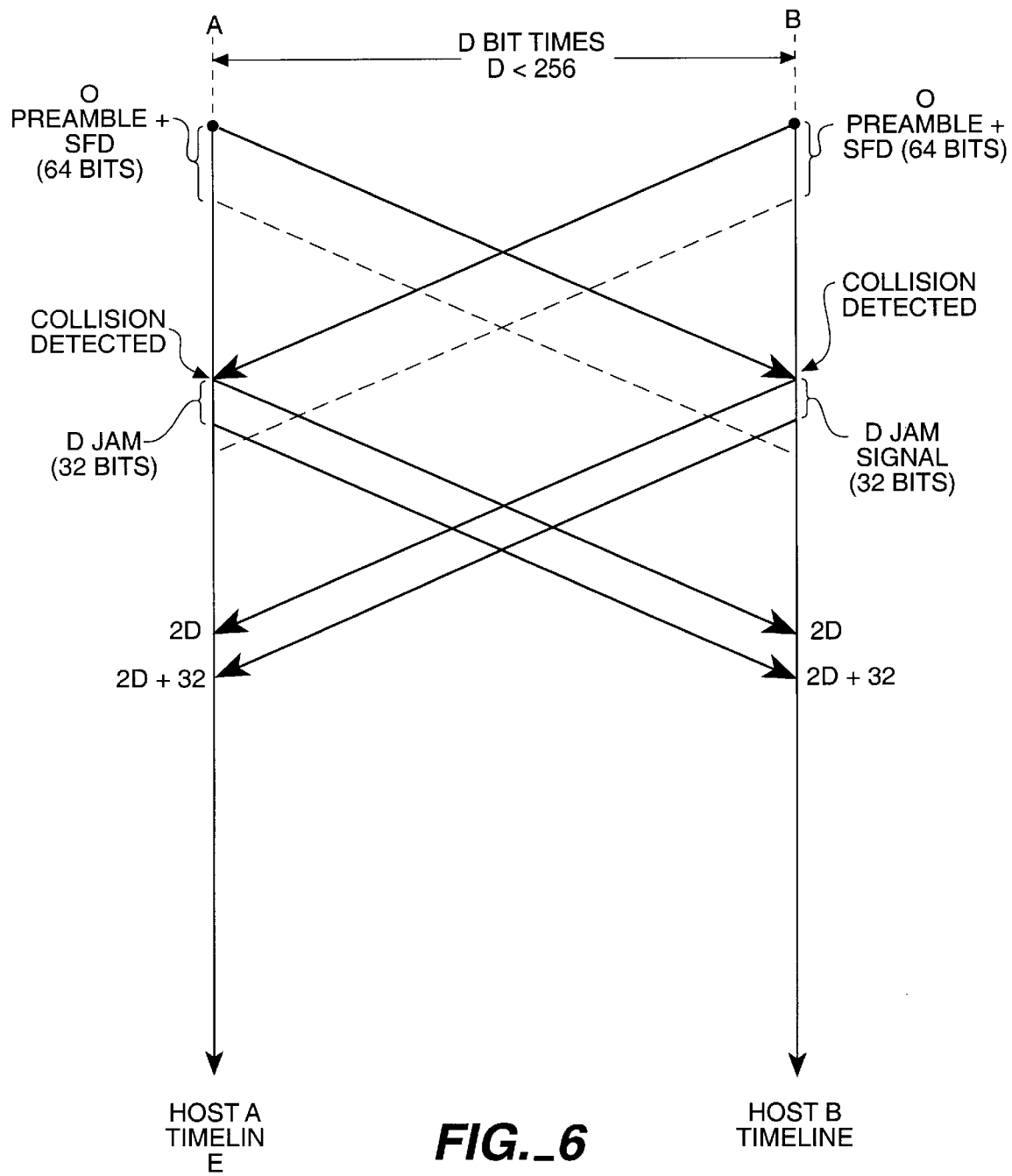
FIG._6

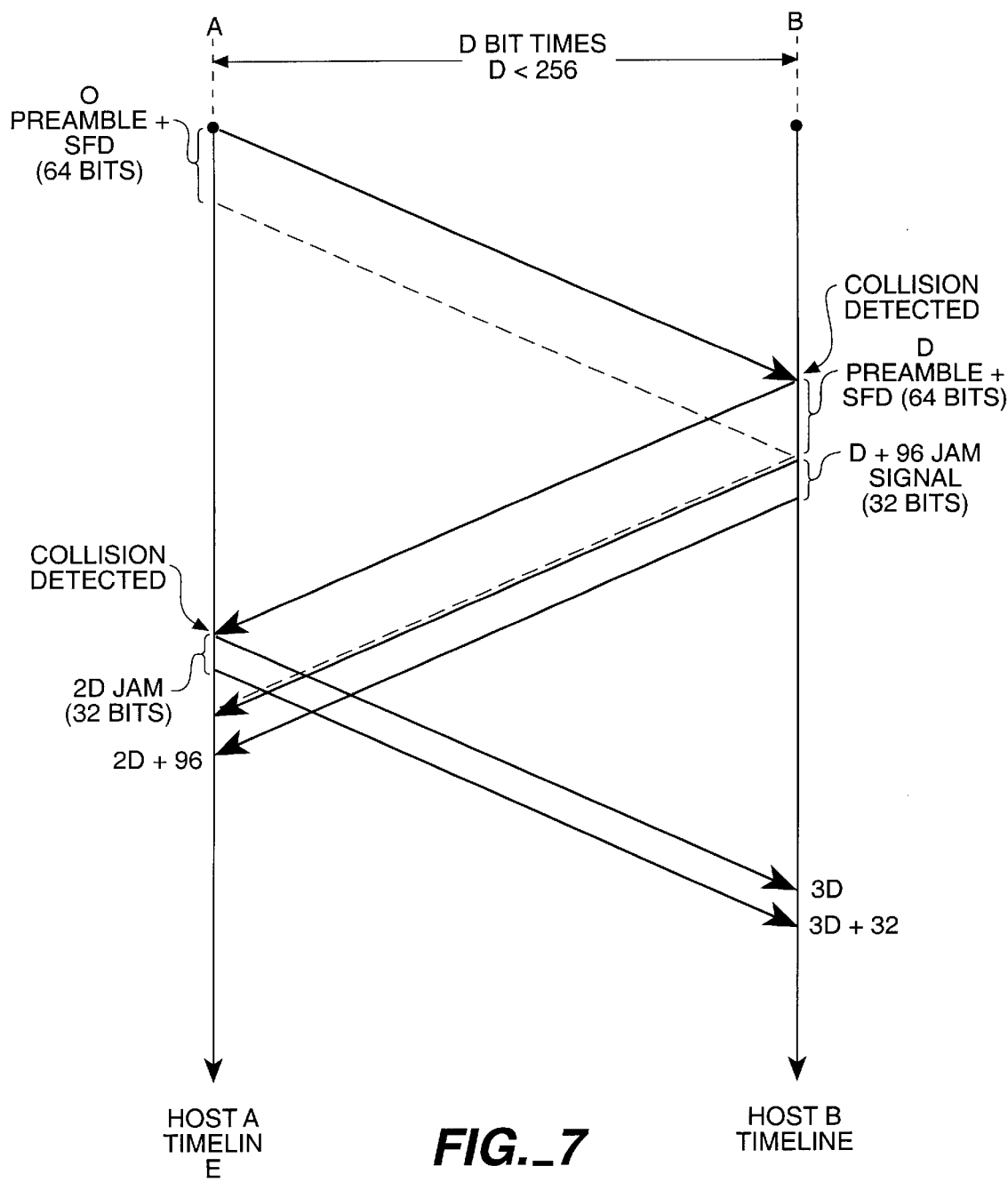
FIG._7

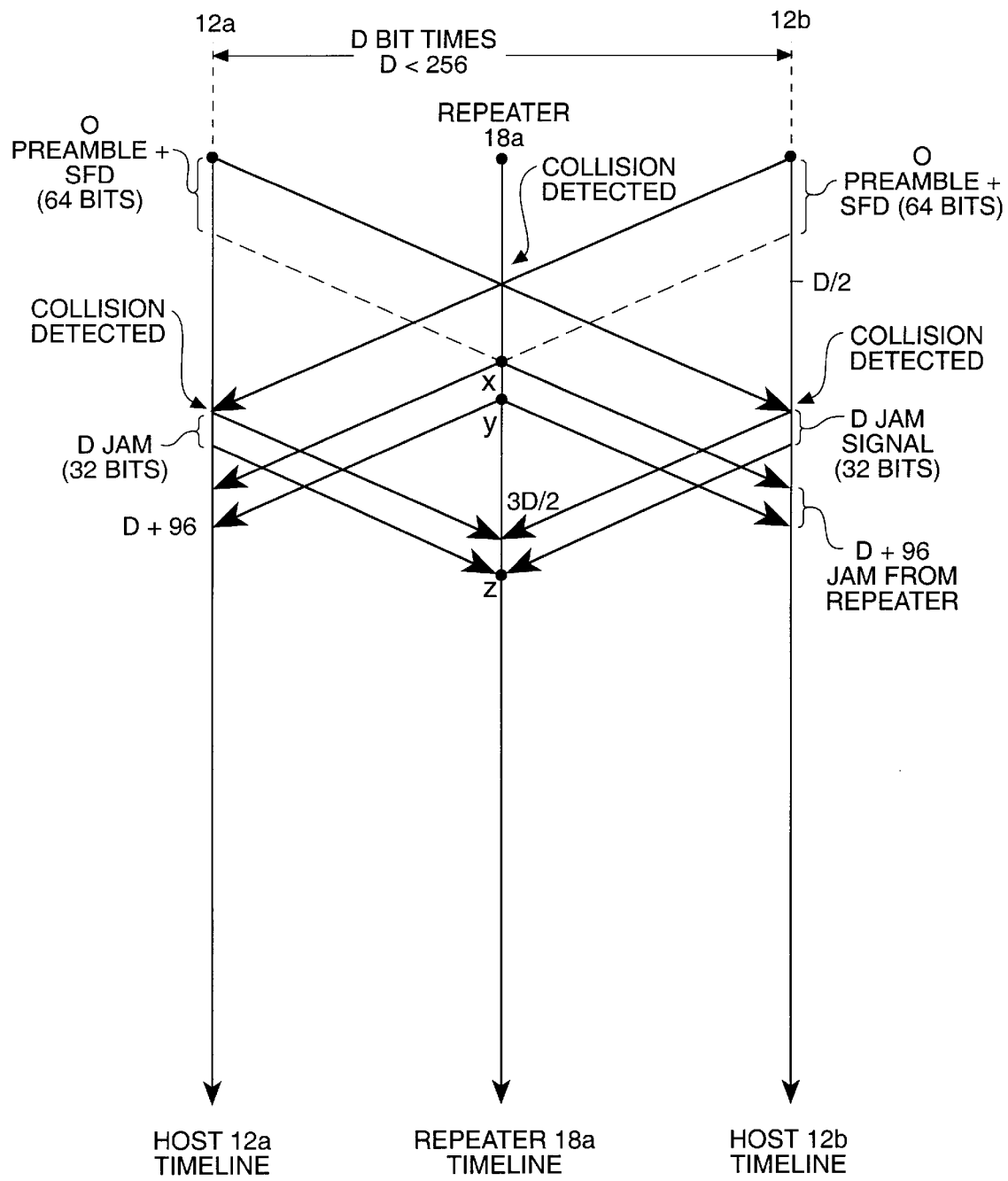
FIG._8

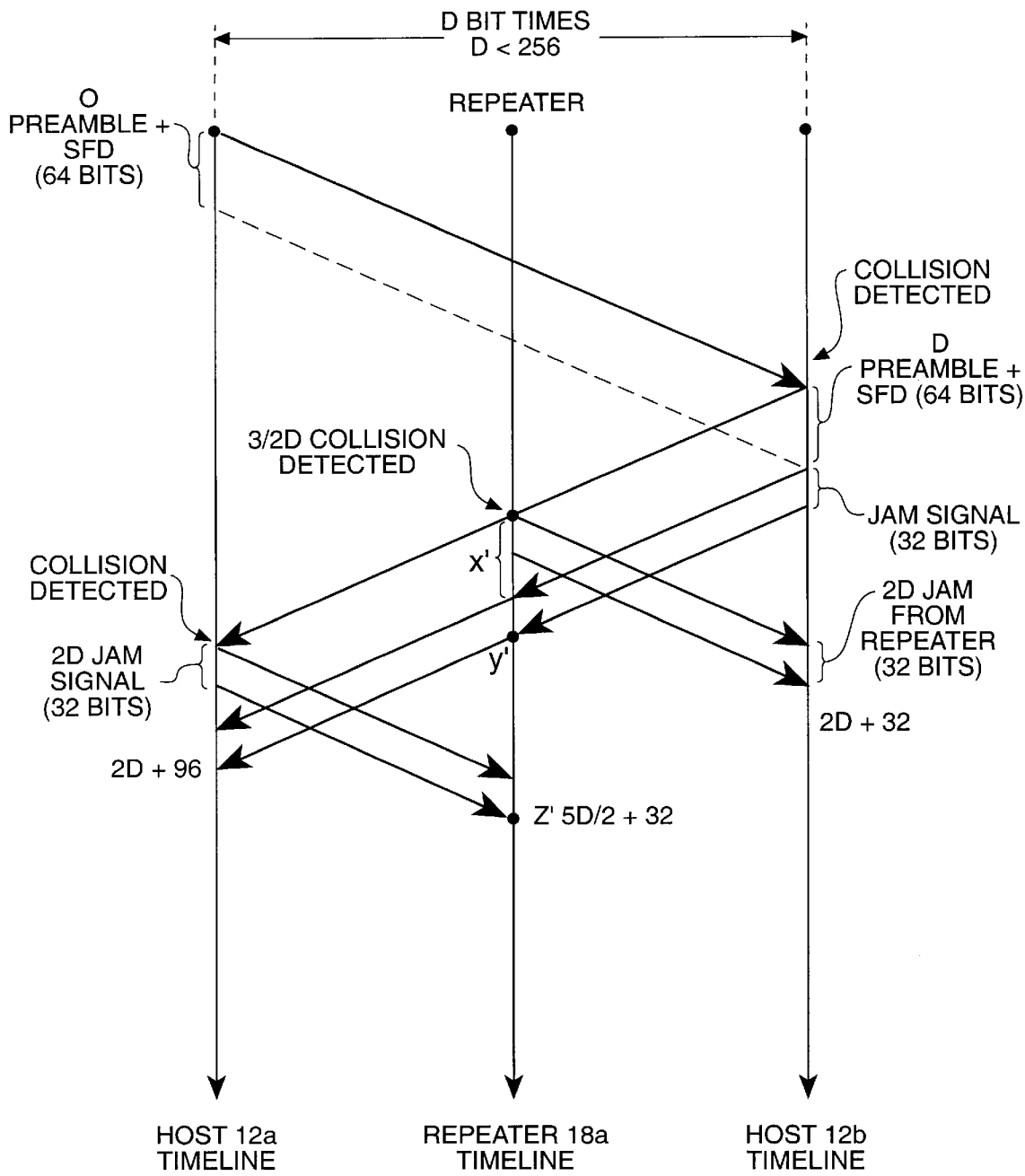
FIG._9

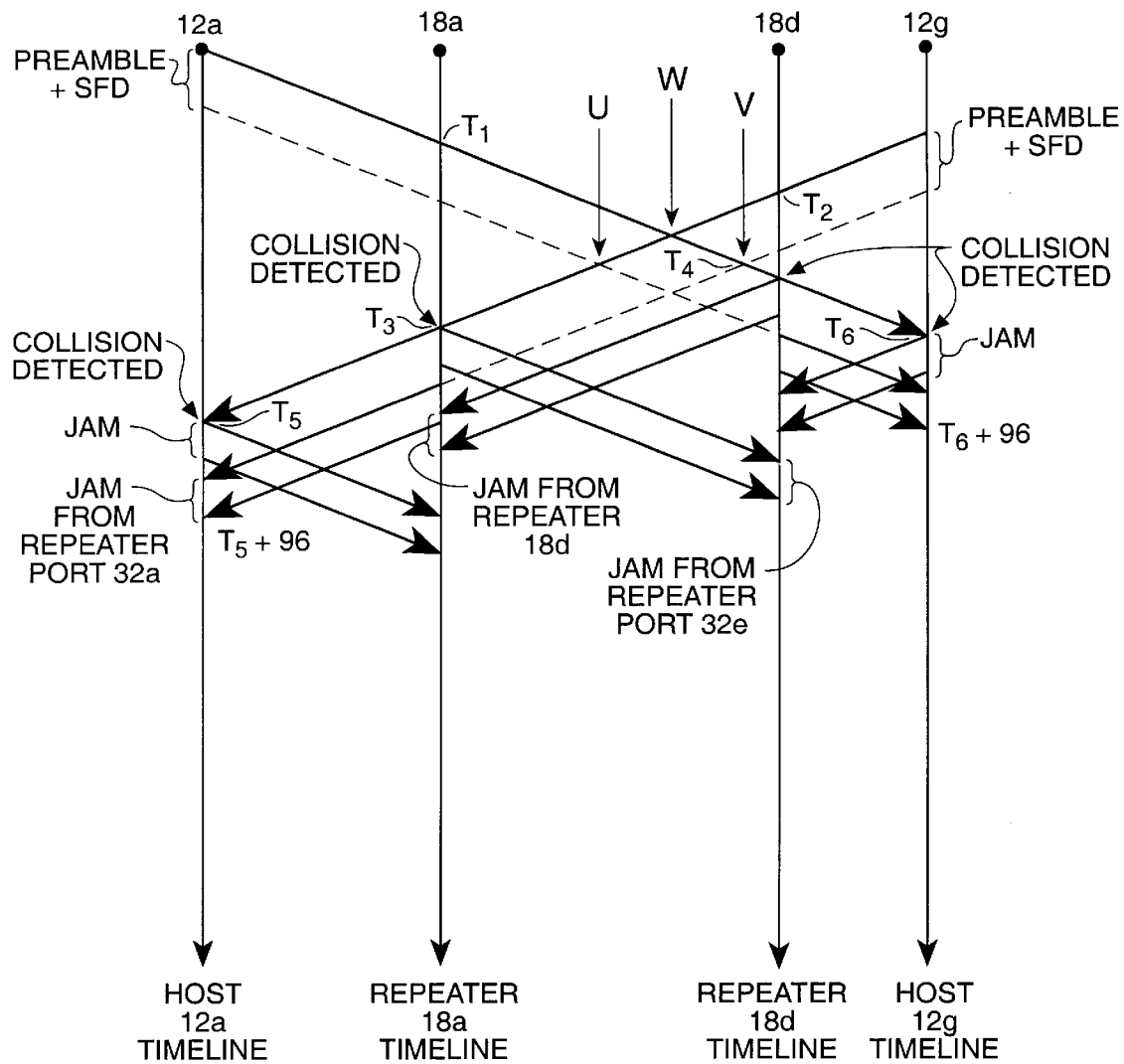
FIG._10

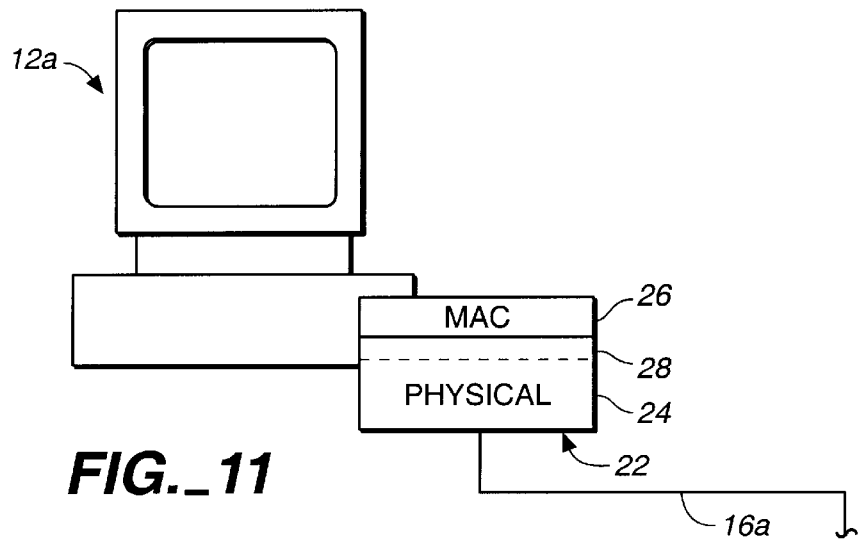
FIG._11
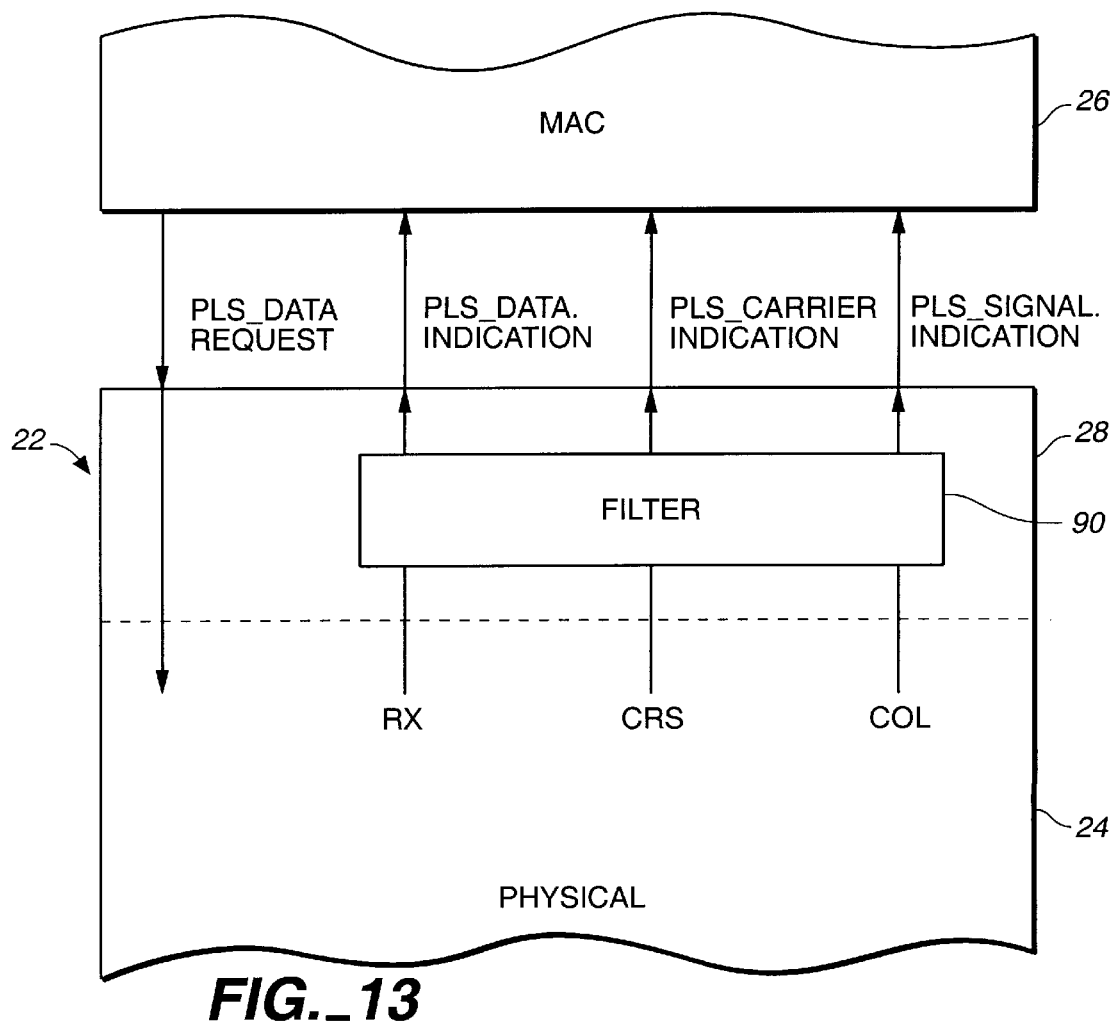
FIG._13

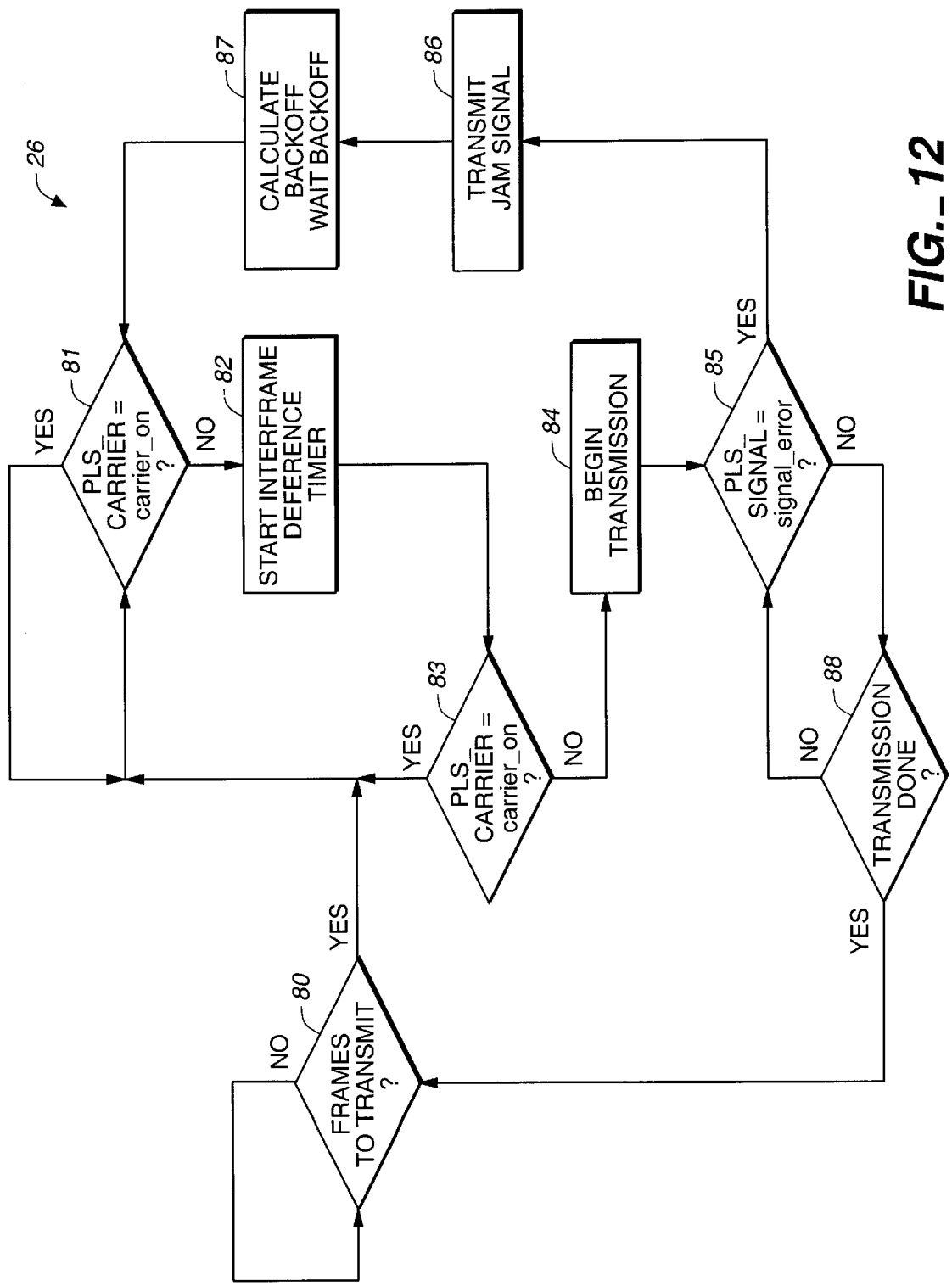
FIG._12

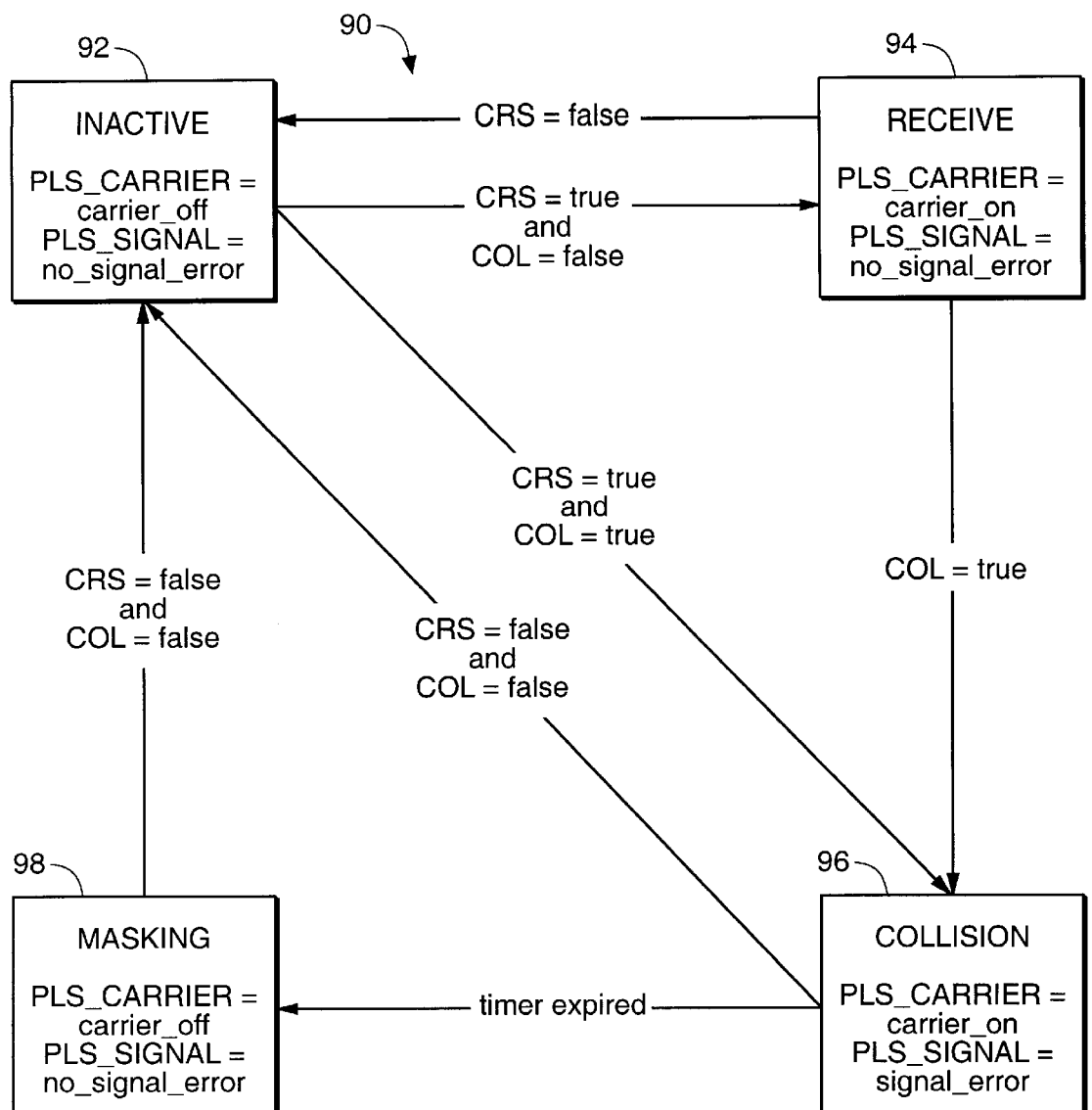
*FIG._14*

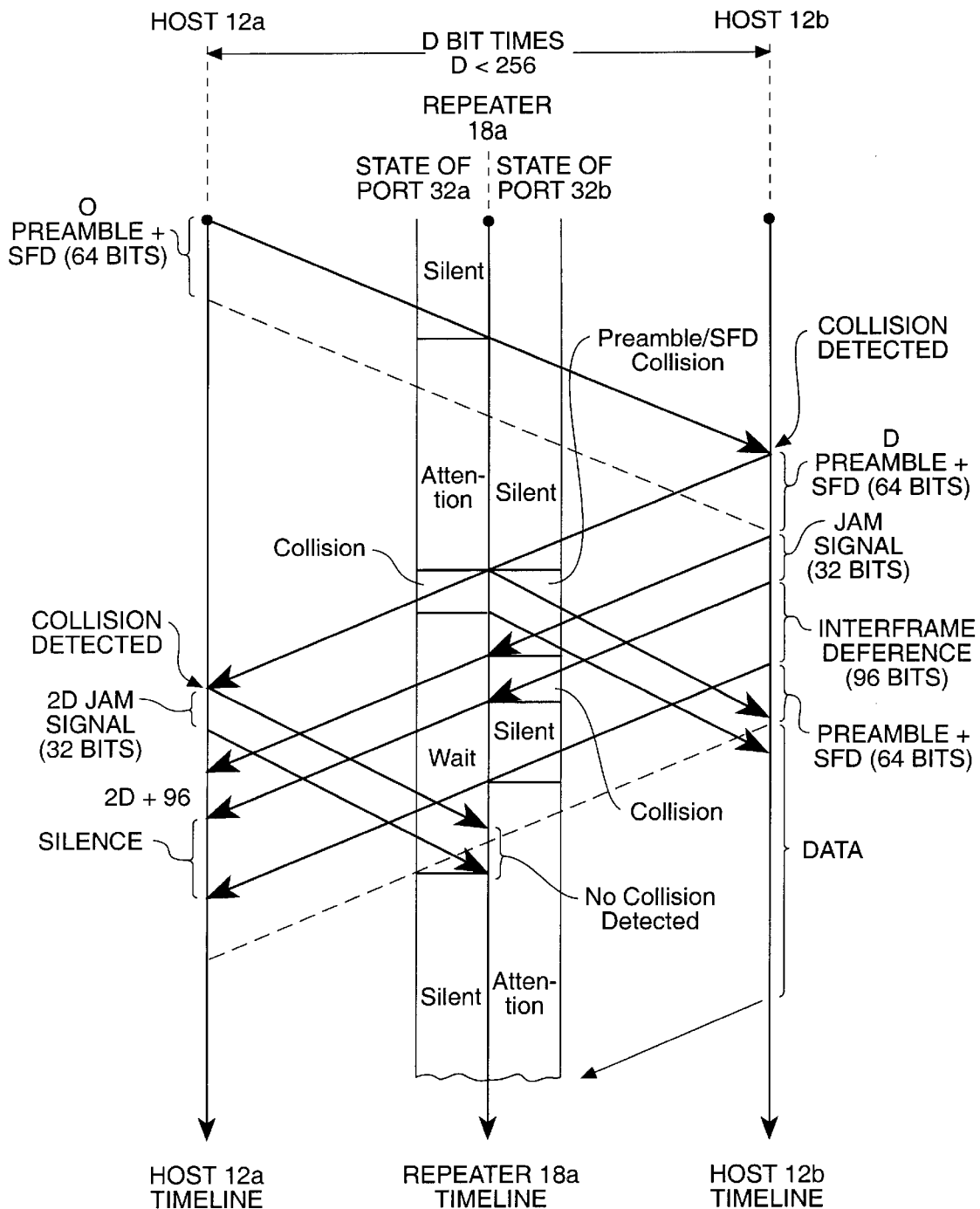
FIG._15

REPEATERS FOR REDUCING COLLISIONS IN AN ETHERNET NETWORK

BACKGROUND OF THE INVENTION

The present invention relates to medium access control sublayer protocols for a shared medium, and more particularly, to repeaters and host interfaces that participate in a collision handling method of a medium access control sublayer protocol for a shared medium.

In any network in which multiple hosts are connected to a single shared communications channel (a multi-access system), there must be a method to resolve contention for the channel. In a multi-access system, data sent by one host will be received by all other hosts. If two different hosts attempt to transmit data simultaneously, there is a collision, and the data is lost. A transmission in which data has been lost is called a collision fragment. The various methods to resolve contests between the hosts and recover from collisions are called medium-access control (MAC) sublayer protocols.

Protocols in which multiple hosts listen for a carrier (i.e., a transmission) to determine whether the channel is currently busy are called carrier sense multiple-access (CSMA) protocols. By waiting until the channel is free to begin transmitting, some collisions are avoided. In an improvement over the CSMA protocol, the host ceases transmitting data to the channel if it detects a collision. Such protocols are called CSMA-CD protocols. Ending a transmission after a collision is detected conserves time and band-width. A host may detect a collision by comparing the data that it transmits to the signal it monitors on the channel.

The Institute of Electrical and Electronics Engineers (IEEE) has produced many standards for local area networks. One such local area network standard is the IEEE 802.3 CSMA-CD standard, originally developed from the Xerox Ethernet. The IEEE 802.3 standard is described in ANSI/IEEE Std.802.8, 1993 Edition, document no. ISO/IEC 18802-3:1993, the entirety of which is hereby incorporated by reference. The original Ethernet consisted of a passive bi-directional bus or cable segment, to which multiple host computers were connected by taps. Whenever a host transmitted data, the resulting signal was transmitted in both directions along the shared bus until the signal was absorbed by terminators at the ends of the bus. Hosts attached to the bus were able to read the signal as it passed by, whichever direction the signal was traveling. The original Ethernet is described in detail in U.S. Pat. No. 4,063,220, the entirety of which is hereby incorporated by reference.

Because of the limited length of its bus segments, the Ethernet design includes devices called repeaters to interconnect two or more buses. A repeater connected to more than two buses is referred to as a multiport repeater. Under the current IEEE 802.3 CSMA-CD standard, a repeater operates under fundamentally the same rules as the original Ethernet. Current repeaters transfer the signals arriving on each bus to any other bus to which the repeater is connected, so that larger and more complex networks may be built. In addition, repeaters "regenerate" the signals by retransmitting them at their original strength.

Under the MAC sublayer protocols of the current IEEE 802.3 CSMA-CD standard, collision handling is carried out entirely by the hosts. A host wishing to transmit data over a network must first wait for silence on the network before starting a transmission. Once the host begins transmitting, it checks for the arrival of other signals from the network which indicate that a collision is taking place. If the host detects the collision, it will (1) finish transmission of the preamble and start frame delimiter (SFD), if it has not already done so; (2) transmit a thirty-two bit jamming sequence; and (3) cease transmitting data. The host then waits until the network is silent (so that all collision fragments have been cleared) before initiating another transmission.

The time consumed in resolving a collision, i.e., the duration of the collision fragment plus the interframe gap, is unavailable for delivering valid data. In large networks a significant amount of time is wasted because a collision must propagate from the originating host to the end of the network and back.

In view of the foregoing, there is a need for an IEEE 802.3 CSMA-CD local area network device that reduces the time spent on collisions and increases the efficiency of the network.

SUMMARY OF THE INVENTION

In general, in one aspect, the invention features a network device. The device features a receiver to receive an incoming signal from a transmission medium and to pass the incoming signal to a consumer and a detector to sense whether the incoming signal is involved in a collision. A filter masks the presence of the incoming signal from the consumer if the detector detects a collision and the incoming signal persists longer than a predetermined duration.

Implementations of the invention may include the following. If the collision is detected during the preamble or start frame delimiter (SFD), the predetermined duration may be long enough for the incoming signal to complete the preamble and the SFD, and for the device to transmit a jamming signal. If the collision is detected after the preamble or SFD, the predetermined duration may be long enough for the device to transmit a jamming signal. The device may include a transmitter which is configured to transmit an outgoing signal onto the transmission medium when there is no incoming signal or when the filter is masking the incoming signal. The consumer may be a core of a repeater, and the filter may prevent a port from passing signals to the core. The consumer may be a medium access (MAC) sublayer of a network interface, and the filter may prevent a physical layer from passing signals to the MAC sublayer. The device may include a jam signal generator which generates a jam signal with a predetermined duration after a collision is detected.

In general, in another aspect, the invention features a method of operating a device in a network. The method features receiving an incoming signal from a transmission medium and passing the passing the incoming signal to a consumer. Whether the incoming signal is involved in a collision is detected, and if a collision is detected and the incoming signal persists longer than a predetermined duration, the presence of the incoming signal is masked from the consumer.

In general, in another aspect, the invention features a method of operating a repeater including a core and a port to connect a network link to the core. The method features detecting a collision and transmitting an inbound signal from the port to the core if no collision is detected. If a collision is detected, then a predetermined duration of the inbound signal is transmit the port to the core, a jam signal is transmit from the port to the core, and the inbound signal is ignored after the jam signal. The repeater acts as if no collision was detected if the inbound signal ceases.

The advantages of the present invention include the following. The network operates with increased efficiency and reduces the time wasted on each collision. In particular, for a network having the maximum allowed distance between two hosts, the present invention can reduce the wasted time consumed by each collision fragment by as much as one-third to one-half, depending on the relative timing of the events that caused the collision. In addition, the method of the present invention preserves collision slot time properties and proper interframe spacing after collisions.

Additional objects and advantages of the invention will be set forth in the description which follows, will be obvious from the description, or may be learned by practice of the invention. The objects and advantages of the invention may be realized and obtained by means of the instrumentalities and combinations particularly pointed out in the claims.

BRIEF DESCRIPTION OF THE DRAWINGS

The accompanying drawings, which are incorporated in and constituted part of the specification, schematically illustrate a preferred embodiment of the invention, and together with the general description given above and the detailed description given below, serve to explain the principles of the invention.

FIG. 1 is a schematic diagram of an IEEE 802.3 CSMA-CD Ethernet network having a hierarchical star architecture.

FIG. 2 is a schematic diagram of a repeater of FIG. 1.

FIG. 3 is a schematic architectural model of a repeater of FIG. 1.

FIG. 4 is a state transition diagram illustrating the operation of the core of a repeater of FIG. 1.

FIG. 5A is a state transition diagram illustrating the receiving operation of a prior art repeater port.

FIG. 5B is a state transition diagram illustrating the receiving operation of a repeater port of FIG. 2.

FIG. 6 is a collision timing diagram for a conventional Ethernet, assuming a minimum start time offset.

FIG. 7 is a collision timing diagram for a conventional Ethernet, assuming maximum start time offset.

FIG. 8 is a collision timing diagram for the network of FIG. 1, assuming a minimum start time offset.

FIG. 9 is a collision timing diagram for the network of FIG. 1, assuming a maximum start time offset.

FIG. 10 is a collision timing diagram for the network of FIG., assuming multiple repeaters between the two hosts involved in the collision.

FIG. 11 is a schematic architectural diagram of a host and host interface of FIG. 1.

FIG. 12 is a state transition diagram illustrating the operation of the MAC sublayer protocol of the host interface of FIG. 11.

FIG. 13 is a functional block diagram of the host interface of FIG. 11.

FIG. 14 is a state transition diagram illustrating the operation of the masking function of the host interface of FIG. 13.

FIG. 15 is a collision timing diagram for the network of FIG. 1, assuming a maximum start time offset.

DETAILED DESCRIPTION

Referring to FIG. 1, a network 10 according to the present invention includes a plurality of hosts 12a–12j which share a transmission medium. The hosts may be computers, workstations, file servers, intelligent printers, or other devices. The transmission medium includes a plurality of links 16a–16m and a plurality of repeaters 18a–18d. The repeaters may be multiport repeaters. Network 10 is arranged in a tree or star configuration in which a repeater, e.g., repeater 18a, is connected to a plurality of hosts, e.g., hosts 12a–12d, by one link to each host, e.g., links 16a–16d. For example, host 12a is connected to repeater 18a by link 16a. In addition, repeaters 18a–18d are connected to each other by links 16k–b 16m. For example, repeater 18a is connected to repeater 18d by link 16k. None of the links in network 10 are shared, i.e., each link is a point-to-point connection between one active electronic device (i.e., a host interface or a repeater port) to another.

Although illustrated with ten hosts, under the IEEE 802.3 CSMA-CD standard, network 10 could have about one thousand hosts. Furthermore, the repeaters need not be arranged in the hierarchical configuration shown, so long as there is only one signal path between any two hosts. In addition, more repeaters could be added to make the network "deeper", i.e., to have more repeaters between the hosts, although under the IEEE 802.3 CSMA-CD standard there may be no more than four repeaters between any two hosts.

In the original Ethernet, each link 16a–16m is a coaxial cable. A transceiver (not shown) and a transceiver cable (not shown) may connect the host, for example host 12a, to a cable segment, e.g. cable segment 16a. As the maximum bandwidth for the Ethernet is one hundred million bits per second, other technologies, such as optical fibers or twisted pair cabling, may be used for cable segments to provide a broader bandwidth. Also, under the Ethernet standard, hosts may not be more than 2.5 kilometers apart. In addition, the longest possible round trip for a signal is 512 bit times. The present invention is not limited to implementation in an Ethernet, but may be applied to any network which uses a CSMA-CD protocol, and specifically a IEEE 802.3 sublayer protocol.

Referring to FIG. 11, each host, such as host 12a, includes a network interface 22 to attach the host to the shared transmission medium. Network interface 22 performs the hardware functions for physical communication. The network interface 22 may be integrated directly into host 12a, or, as in a general purpose computer, the network interface may be installed as a network interface card. The network interface typically implements a physical layer 24, i.e., the necessary physical components to connect the host to the transmission medium, and a medium access control sublayer 26, i.e., the hardware, firmware and/or software to carry out the MAC sublayer protocol.

Referring to FIG. 2, a repeater, such as repeater 18a, has a core 30 and a plurality of ports 32a–32e. Repeaters 18b–18d are constructed similarly to repeater 18a. Each port, such as port 32a, is connected to one link, such as link 16a. Also, each port is connected to core 30 via data channels 34. In general, repeater 18a receives a signal from link 16a through port 32a and passes it into core 30. The core 30 transmits the signal through the other ports 32b–32e to links 16b–16d and 16k.

An architectural model for repeater 18a is shown in FIG. 3. The core 30 implements a repeater function to transmit signals from one port to the other ports. Each port 32a–32e implements a physical signaling sublayer (PLS) 40, i.e., the hardware required to translate the data being transmitted into the proper electrical signals that are then broadcast over the transmission medium. The PLS 40 is also responsible for decoding signals that it receives and passing the resulting data up to the MAC sublayer. In addition, some ports, such as ports 32a and 32c, may implement a physical medium attachment (PMA) 42, i.e., the hardware required to provide the physical and electrical interface between a link and a port, such as between link 16a and port 32a. On the other hand, some ports, such as ports 32b–32d, may lack the physical medium attachment sublayer.

Each port in repeater 18a includes a set of collision handling rules 44. Collision handling rules 44 act as a filter to allow the repeater port to ignore an incoming signal following a collision. These collision handling rules provide part of the functionality of the MAC sublayer. However, the collision handling rules 44 are implemented as a part of PLS 40. Traditional repeaters do not implement any of the functions of the MAC sublayer and are designed to be transparent to the MAC sublayer protocol.

The collision handling rules 44 implemented by PLS 40 allow each repeater to become an active participant in the CSMA-CD collision handling operation rules. Specifically, repeater ports 32a–32e may simulate the timing of network events that would have occurred in a collision if the distance between the transmitting host and the repeater port had been much smaller. If the repeater port detects a collision, it may execute a sequence of collision handling steps, as described in detail below, to reduce the time wasted on the collision.

To provide background, the operation of a traditional repeater will be described. In a traditional repeater, if a signal is received at exactly one port, the core copies that signal from that port to each of the other ports. In addition, over the duration of a collision event (i.e., an interval of time in which there are signals arriving at more than one port), the core of the traditional repeater instructs all ports to transmit a jam signal. Because the traditional repeater continues to transmit whenever there is an incoming signal on any port, the traditional repeater does not affect the medium-access control sublayer protocol and plays no role in collision handling.

In contrast, the repeaters in network 10 participate in collision handling in order to reduce the time wasted resolving collisions. Specifically, in the preferred embodiment, repeaters 18a–18d carry out the following steps:

1) When a port receives a new signal from a link, the repeater forwards the new signal to the repeater core for distribution to the other ports.

2) When the repeater core receives an incoming signal from a port, the core forwards a copy of the signal to each of the other ports.

3) When a port receives a signal from the repeater core, the port transmits the signal on its attached link.

4) In the event of a collision, i.e., if the core receives incoming signals from more than one port, each port receiving a signal will,
   a) ensure that it has forwarded the preamble and start-frame delimiter (SFD) to the core (assuming that the incoming signal is still continuing);
   b) thereafter, send a thirty-two bit jam signal to the repeater core (again assuming that the incoming signal is still continuing); and
   c) not transmit any further portion of the incoming signal to the core, no matter how long the incoming signal continues.

Once the incoming signal ends, the state of the port is reset and the port may begin forwarding signals to the repeater core.

The operation of a repeater of the invention will now be described in terms of the variables and functions listed below. These variables and functions may be implemented in a hardware structure, such as an application-specific integrated circuit (an ASIC), in a computer program executed by a microprocessor from RAM or ROM or embedded in an embedded microprocessor, or in a hybrid structure.

| | |
|---|---|
| activity(port) | A variable to indicate whether a port is active. |
| | Zero: the port is not active |
| | One: the port is active |
| activity(all) | The sum of activity (port) from each port, usually indicating the total number of active ports. |
| | Zero: indicates that there are no incoming signals; the network is quiet |
| | One: indicates that there is an incoming signal on exactiy one port; the repeater may copy the signal to the other ports |
| | Two or more: indicates that a signal is being received at two or more ports; a collision is in progress at the repeater |
| carrier_present(port) | A flag indicating whether there is an incoming signal on the line attached to the port. |
| | True: There is an incoming signal on the line. |
| | False: The line is idle or the port is transmitting. |
| Pream & SFD | A flag indicating whether the preamble and SFD have been transmitted to the core. The flag may be set to the SENT state if the port has been transmitting a signal for more than sixty-four bits. |
| | SENT: The preamble and SFD have been transmitted to the core. |
| | not SENT: The port has not completed sending the preamble and SFD to the core. |
| jam_timer | A timer for the length of the jam signal sent by the port to the core following a collision. In one implementation, the length of the jam signal is thirty-two bit times. |
| | jam_timer_not_done: The timer is running. The timer is started by entering a state including the function start_jam_timer. |
| | jam_timer_done: The timer has expired and not been reset. |
| IN(port) | A flag to the port indicating the type of input that the port is to relay to the core. |
| | None: The port ignores the signal on the line and does not input any signal to the core. |
| | Signal: The port inputs the signal on the line to the core. |
| | Jam: The port ignores the signal on the line and inputs a jam pattern to the core. |
| command(port) | A flag sent from the core to the specified ports to inform the ports of the state of the repeater. |
| | Quiet: the repeater is in an IDLE state because there are no incoming signals, or the repeater is in an ACTIVE state and the port is receiving a signal; the port should not output a signal on the line |
| | Copy:the repeater is in an ACTIVE state because a signal is incoming on exactly one port; the port should output the signal from the core on the line |
| | Collision: the repeater is in a JAM state because there is more than one incoming signal; the port should output a jam signal on the line |
| N | A variable for designating the port at which an incoming signal is being received. |

Referring to FIG. 4, core 30 begins in state IDLE 50 after power has been turned on. At the beginning of state IDLE 50, core 30 sends a quiet command to all ports. Core 30 then waits for one or more ports to become active. Once one port becomes active, i.e., the port receives an incoming signal, activity(all) will equal one and repeater core 30 will proceed to state ASSIGN 52.

In state ASSIGN 52 the variable N is set equal to the port number at which the signal is being received. Core 30 then proceeds to state ACTIVE 54. In state ACTIVE 54 a copy command is sent to all ports except port N, and a quiet command is sent to port N. This instructs all of the ports except the port at which the signal is being received to retransmit the signal. If a collision occurs during state ACTIVE 54, i.e., if activity(all) is larger than one because the repeater has incoming signals from two links, then core 30 proceeds to state JAM 56. However, if no collision occurs, when all of the data is sent, activity(all) will become zero and core 30 will return to state IDLE 50.

Once in state JAM 56, core 30 sends a collision command to all ports. Core 30 may enter state JAM 56 as has been described, or directly from state IDLE 50 if activity(all) charges directly from zero to a value greater than zero. This could occur, for example, if two transmissions are received at different ports simultaneously. While in state JAM 56, core 30 waits until the collision ends. Specifically, if activity (all) becomes one, then core 30 goes to state ASSIGN 52, whereas if activity(all) becomes zero, core 30 goes to state IDLE 50.

Referring to FIG. 5A, a state diagram illustrating the receiving operation performed by a traditional repeater port is shown to provide further background. This receiving operation employs two relevant states, state SILENT 60 and state ATTENTION 62. Other states are used for the handling of errors, e.g., if there an improper signal is received. However, because these states are not pertinent to the invention, they are not further described.

The traditional repeater begins in state SILENT 60. At the beginning of state SILENT 60, the variable activity(X) is set to zero to indicate that there is no incoming signal on the line. Because there is no incoming signal, the port does not transmit any data to the core, and the flag IN(X) is set to "none". The traditional repeater port then waits for an incoming signal on the line. When the port senses an incoming signal, i.e., carrier_present is set as true, the port proceeds to state ATTENTION 62.

Once the repeater is in state ATTENTION 62, the variable activity(X) is set to one to indicate that there is an incoming signal on the line, and the flag IN(X) is set to "signal". The repeater port then waits for the incoming signal to end. When the port no longer senses the incoming signal, i.e., carrier_present is set as false, the port returns to state SILENT 60.

In summary, by following the method set out above, the port of the traditional repeater simply relays any incoming signal to the core.

In contrast, repeater ports 32a–32e are able to cease relaying incoming signals to core 30 after a collision in order to reduce the duration of collision fragments. In addition, after a collision, ports 32a–32e are able to force activity(X) to zero, even if a signal is incoming on the attached link.

Referring to FIG. 5B, the receiving operation of a port of the present invention includes five states, state SILENT 70, state ATTENTION 72, state PREAM & SFD COLLISION 74, state COLLISION 76, and state WAIT 78.

Port 32a begins in state SILENT 70 by setting the variable activity(X) to zero to indicate that there is no incoming signal on link 16a. Because there is no incoming signal, port 32a does not transmit any data to the core, and flag IN(X) is set to "none". Alternately, because there is no incoming signal, essentially the same results may be accomplished by setting flag IN(X) to "signal". Repeater port 32a then waits for an incoming signal on link 16a. When the port senses an incoming signal, i.e., carrier_present is set as true, the port proceeds to state ATTENTION 72.

Once in state ATTENTION 72, activity(X) is set to one to indicate that there is an incoming signal on the line, and IN(X) is set to "signal". If the signal ceases, i.e., carrier_present goes false, then the port returns to state SILENT 70. However, if a collision occurs while there is an incoming signal on link 16a, i.e., while carrier_present is true, then port 32a proceeds either to state PREAM & SFD COLLISION 74 or to state COLLISION 76.

Port 32a enters state PREAM & SFD COLLISION 74 if a collision command is sent to the port but the port has not completed sending the preamble and SFD to core 30. In state PREAM & SFD COLLISION, the port will continue to send the incoming signal to core 30, i.e., IN(X) will be set to "signal". If the incoming signal ceases, i.e., carrier_present goes false, then port 32a goes to state SILENT 70. However, if the port completes sending the preamble and SFD to core 30 but the collision is still occurring, then port 32a enters state COLLISION 76.

Port 32a enters state COLLISION 76 if a collision command is sent to the port and the port has completed sending the preamble and SFD to core 30. When port 32a enters state COLLISION 76, the timer jam_timer will be reset and will begin running. While in state COLLISION 76, port 32a begins to input a jam signal to core 30, i.e., IN(X) will be set to "jam". If the incoming signal ceases, i.e., carrier_present is set to false, then port 32a returns to state SILENT to set activity(X) to zero. Otherwise, the port continues to transmit the jam signal until the timer expires, i.e., timer_done is true. When the timer expires, port 32a enters state WAIT 78.

In state WAIT 78, port 32a does not send the incoming signal to repeater core 30. Instead, port 32a is silent, i.e., IN(X) is set to "none". Port 32a remains in state WAIT 78 until the signal on link 16a ends, i.e., carrier_present goes false. Port 32a then returns to state SILENT 70.

The transmit operation of port 32a, i.e., the control of the signals output by the port onto link 16a, is extremely simple. Even if there is an incoming signal, port 32a outputs any signal received from core 30 onto link 12a.

The improved efficiency of the present invention may be demonstrated by comparison of FIGS. 6, 7, 8, and 9. FIGS. 6 and 7 show the time lines of collisions in a conventional Ethernet network. FIGS. 8 and 9 show the time lines of collisions in network 10. In the following discussion, D is defined as the time for a signal to travel from one host to another host, as measured in bit times. Thus, the round trip delay, i.e., the time for a signal to travel from one host to another host and back, is 2D. The round-trip delay is also the maximum time difference at a host between the beginning of a transmission attempt until that same host detects the start of a colliding frame transmission from another host. Under the IEEE 802.3 CSMA-CD standard, the maximum round-trip delay is the slot time, i.e. 512 bit times.

FIG. 6 and 7 are collision time lines for a traditional Ethernet network including hosts A and B. Assuming that both hosts begin transmitting at the same time, as shown by FIG. 6, then hosts A and B will receive the signal from the other host A at time D, cease their own transmissions, and begin transmitting a thirty-two bit jam signal. The jam signals from hosts A and B will reach the opposite hosts at time 2D. Because the jam signal is thirty-two bits in length, both hosts will sense activity on the network from time 0 until time 2D+32. If D=256 bit times, the worst case, then each collision fragment duration will be at most 544 bit times.

On the other hand, if host B begins transmitting at the same time that the signal from host A arrives, as shown in FIG. 7, then host B will continue to transmit its preamble and SFD for sixty-four bits, and then transmit a jam signal for thirty-two bits. The signal from host B will reach host A at time 2D, and consequently host A will transmit normally from time 0 to time 2D, and then transmit a thirty-two bit jam signal when it detects the collision. The jam signal from host A will reach host B at time 3D, and therefore host B will sense activity on the network from time D until time 3D+32 whereas host A will sense activity on the network from time 0 to time 2D+96. Therefore, assuming D=256 bit times, the collision fragment will occupy 608 bit times for host A and 544 bit times for host B. Of course, hosts in an intermediate position between hosts A and B will see shorter collision fragments. FIGS. 6 and 7 do not include any repeaters, although some repeaters would be required because an individual cable segment would not be sufficient to construct a traditional Ethernet network having a host to host distance of 256 bit times. The repeaters are not shown because under the traditional Ethernet operating rules, the repeater is transparent to the collision handling protocols. Therefore, each repeater may be characterized by its port-to-port latency and may be represented by an additional length of cabling.

FIGS. 8 and 9 are collision time lines for a network 10 according to the present invention including repeater 18a positioned at the midpoint of the signal path consisting of links 16a and 16b between hosts 12a and 12b. FIG. 8 shows the event timing if hosts 12a and 12b transmit signals simultaneously, whereas FIG. 9 shows the event timing if host 12b begins to transmit its signal just before it receives the signal from host 12a. Referring now to FIG. 8, if hosts 12a and 12b begin transmitting simultaneously, then repeater 18a will detect a collision at time D/2 when there is an incoming signal on two repeater ports. Once each port is instructed that by the core that there has been a collision, that port will continue to supply incoming bits to the repeater core for the duration of a preamble and start frame delimiter (sixty-four bits), that is, the repeater port will continue to transmit data to the core from the time that the collision is detected to time X at D/2+64. Then, from time X to Y, ports 32a and 32b will transmit a jam signal to repeater core 30. The jam signal ends at time Y at D/2+96. Thereafter, each repeater port will cease transmitting the incoming signal from the hosts to the core. Therefore, since no transmissions are entering the core, there will be no outbound signal to any port, and no signal sent out from repeater 18 to any host following time Y. Meanwhile, each host will receive the jam signal from the repeater at time D and detect a collision. After detecting the collision, each host will transmit a thirty-two bit jam signal back up its respective link. Thus, each host will transmit normally from time 0 to time D, then transmit a thirty-two bit jam signal, and stop transmitting at time D+32. Both hosts will sense their respective links as busy from time 0 to time D+96. The jam signals from the hosts will reach the repeaters at time 3D/2 and last until time 3D/2+32 at time Z. Assuming that D=256 bit times, the worst case, then hosts 12a and 12b will experience a collision of duration 352 bit times, as opposed to 544 bit times in the traditional Ethernet. In addition, if repeater 18a has ports other than ports 32a and 32b, then the other ports will begin transmitting an outbound signal at time 3D/2 and cease transmitting at time Y at 3D/2+96, (instead of at time 5D/2 for a traditional repeater). Thus, repeater 30 will be involved in a collision for only 96 bit times (instead of 288 bit times for a traditional repeater). Therefore, in the worst case scenario, the duration of the collision at hosts 12a and 12b is reduced by 32%, whereas the duration of the collision at the non-transmitting hosts is reduced by 67%.

Referring to FIG. 9, host 12a begins transmitting at time 0, whereas host 12b begins transmitting just before it receives the signal from host 12a, i.e., at time D. Therefore, host 12b begins to transmit its preamble and SFD for sixty-four bits, and then transmits a thirty-two bit jam signal. The preamble signal transmitted by host 12b reaches the repeater at time 3D/2, at which point the repeater detects a collision. Once a collision has been detected, repeater port 32a has already been forwarding inbound data from host 12a to core 30 for more than sixty-four bits, and therefore it may immediately switch to transmitting a thirty-two bit jam sequence, and thereafter cease supplying any further data to the repeater core—even though incoming data continues to arrive from host A. In contrast, port 32b has just begun to forward inbound data from host 12b to the repeater core. Therefore, port 32b continues to supply the preamble and SFD (sixty-four bits). After the preamble and SFD are complete, port 32b transmits a thirty-two bit jam signal to repeater core 30. Only then does repeater core 32b ignore the remainder of the incoming signal from host 12b. Therefore, host 12b will transmit from time D to time D+96 and will sense activity from time D to time 2D+32. The signal from host 12b will reach host 12a at time 2D, at which point host 12a will detect a collision and transmit a thirty-two bit jam signal. However, the signal from host 12b will continue to arrive at host 12a for an additional sixty four bits (the remainder of the preamble plus thirty-two bits of the jam signal) so that host 12a will sense a busy carrier from time 0 to time Y' at 2D+96, and will transmit from time 0 to time 2D+32. Although the performance of host 12a is no better than in a traditional Ethernet network, for host 12b the duration of the collision will be at most 288 bit times, assuming that D=256 bit times, or a reduction of 47% over the traditional network. In addition, if repeater 18a has ports beside ports 32a and 32b, then these ports will transmit outbound signals from time D/2 until the time Y' at 3D/2+96 (instead of at time Z' at 5D/2+32), or 352 bit times. This is a reduction of 35% over the worst case scenario of 544 bit times in a conventional repeater.

An additional advantage of the collision detecting repeater is that it will tend to synchronize the starting time of the transmitters and thereby further decrease the time wasted by collisions. Comparing FIGS. 6 and 8 to FIGS. 7 and 9, one may see that the total elapsed time during a collision event is smaller if the hosts start transmitting at the same time. However, an offset may be generated following a collision because the hosts will sense an open carrier at different times. Therefore, if two host become ready to transmit simultaneously during a collision fragment, both hosts will attempt to transmit as soon as they detect the end of the collision. Turning to FIG. 7, one may see that in the traditional Ethernet the maximum offset between hosts A and B is D−64, or 192 bit times in the worst case. In contrast, turning to FIG. 9, in network 10, the maximum offset between hosts 12a and 12b is ninety-six bit times. Consequently, if both hosts become ready to transmit data upon detection of a open or clear carrier, the offset times will be smaller in network 10.

Although FIGS. 6 and 7 demonstrate the effect of repeater 18a located at the midpoint between hosts 12a and 12b, the repeaters in network 10 will still shorten collision fragments if the distances to each host are not equal. Links 16a–16d need not each have the same length.

In addition, although FIGS. 8 and 9 demonstrated the effect of a single repeater located between two hosts involved in a collision, multiple repeaters may be located in the signal path between the hosts. For example, repeaters 18a and 18d are located in the signal path (consisting of links 16a, 16k and 16g) between hosts 12a and 12g (see FIG. 1). Repeaters 18a and 18d function to shorten both collision fragments.

Referring to FIG. 10, repeaters 18a and 18d may be positioned unevenly, i.e., links 16a and 16g do not have equal lengths. Repeater 18a will begin receiving a signal from host 12a at time $T_1$ and will retransmit the signal to the other ports, including the port connected to link 16k. Similarly, repeater 18d will begin receiving a signal from host 12g at time $T_2$ and will retransmit over the other ports. Therefore, repeater 18a will detect a collision at time $T_3$. In accord with the rules described above, repeater 18a will cease transmitting on link 16k at time $T_3+32$ bits (thirty-two bits of jam signal) and cease transmitting on link 16a at time $T_3+96$ bits (sixty-four bits for the preamble and SFD and thirty-two bits for the jam signal). Repeater 18d will detect a collision at time $T_4$, and it will cease transmitting on link 16a at time $T_4+96$ bit and on link 16k at time $T_4+32$ bits. Host 12a will experience a collision at time $T_5$ and will detect a quiet link at time $T_5+96$ bits. Similarly, host 12g will detect a collision at time $T_6$ and will detect a quiet network at time $T_6+96$.

More generally, the placement of a repeater anywhere to the right of point "U", at the intersection of the start of transmission from host 12g and the end of the SFD from host 12a, will truncate the collision time experienced by host 12a to the smallest possible length, i.e., ninety-six bits. Similarly, the placement of a repeater anywhere to the right of point "V", at the intersection of the start of transmission from host 12a and the end of the SFD from host 12g, will truncate the collision time experienced by host 12g to the smallest possible length.

Hosts 12a–12j transmit data in a series of "frames". Each frame includes a data packet, and additional information such as a preamble, a field length, a padding, a checksum, or a frame delimiter. Each successive frame transmitted by a host is separated by an "interframe gap" of approximately ninety-six bit times. The original purpose of the interframe gap was to provide time for components of the network, such as the physical medium, to recover. As mentioned above, hosts sense the presence of a carrier signal to avoid transmitting data when the shared medium is already busy. If a host is deferring transmission of a stored frame because the shared medium is busy, then after the shared medium is clear, the host will wait at least ninety-six bit times to commit to transmitting its own stored frame. This is typically accomplished by means of an interframe deference timer which is started when the carrier sense indicates that the shared medium is clear.

Referring to FIGS. 11 and 13, network interface 22 implements physical layer 24 and MAC sublayer 26. The physical layer provides the following services to the MAC sublayer to carry out the collision handling protocol:

PLS_DATA.request: sent from the MAC sublayer to the physical layer to instruct the physical layer to transmit a single bit of data onto the transmission medium.

PLS_DATA.indication: sent from the physical layer to the MAC sublayer to indicate that the interface has received a bit from the transmission medium (bit_received), or that no data is incoming from the link (no_bit_received).

PLS_CARRIER.indication: sent from the physical layer to the MAC sublayer to indicate that the transmission medium is idle (carrier_off), or that there is a signal on the transmission medium (carrier_on).

PLS_SIGNAL.indication: sent from the physical layer to the MAC sublayer to indicate that a collision is in progress (signal_error), or that the collision has ended (no_signal_error).

Referring to FIG. 12, a simplified flowchart illustrating the operation of MAC sublayer 26 of the present invention is shown. MAC sublayer 26 begins by determining whether the host has a frame to transmit (step 80). Once the MAC sublayer has a frame to transmit, it senses whether the transmission medium is busy, i.e., if PLS_CARRIER is set to carrier_on (step 81). If the transmission medium is busy, then the MAC sublayer waits. Once PLS_CARRIER is set to carrier_off, MAC sublayer 26 proceeds to start a interframe deference timer (step 82). If a new signal reaches the interface during the deference timer (step 83), the MAC sublayer returns to step 81. If the interframe time expires and the carrier is still silent (step 83), the host may commit to transmitting a frame (step 84). If it detects any collisions during the transmission, i.e., if PLS_SIGNAL is set to signal_error (step 85), MAC sublayer 26 causes the host to send a jam signal (step 86), computes and waits for a backoff time (step 87), and then returns to step 81 to wait for the transmission medium to be silent. If MAC sublayer 26 detects that the transmission has ended (step 88), then it returns to step 80 to determine whether there is another frame to transmit.

In the present invention the network interfaces 22 of each host 12a–12j participate in the collision handling method. Referring to FIG. 13, network interface 22 also includes, in addition to the collision handling protocols of the MAC sublayer, a set of collision handling rules 28. Collision handling rules 28 may be implemented as part of the MAC sublayer, but preferably are implemented in physical layer 24. Collision handling rules 28 permit the interframe deference timer in MAC sublayer 26 to begin even if a signal is arriving at the interface. Specifically, collision handling rules 28 include a filter or masking function 90 that allow network interface 22 to ignore incoming signals from link 16a under the same conditions that repeater port 32a ignores incoming signals on link 16a, i.e., starting ninety-six bits after a collision and lasting until the link is silent. Like the repeater port, the physical layer of the invention does not transmit received bits to the MAC sublayer during this period.

Masking function 90 uses the following three inputs:

COL: Indicates the presence of a collision, as determined in the physical layer by comparing the signals that the host is attempting to transmit to the signals on the link. True: Collision occurring. False: No collision.

CRS: Indicates the status of the carrier True: There is a signal on the link. False: The link is idle.

RX: Indicates whether the interface has received a bit from the transmission medium. True: Physical layer has a bit to input to MAC sublayer. False: Physical layer does not have a bit to input to MAC sublayer.

The masking function converts the RX, CRS, and COL inputs into the basic services PLS_DATA, PLS_CARRIER, and PLS_SIGNAL described above.

Referring to FIG. 14, masking function 90 includes four states: state INACTIVE 92, state RECEIVE 94, state COLLISION 96, and state MASKING 98.

Masking function 90 begins in state INACTIVE 92 when COL and CRS are false. In this state, PLS_DATA is set to the same status as RX, PLS_CARRIER is set to carrier_off, and PLS_SIGNAL is set to no_signal_error. If CRS changes to carrier_on, then the masking function will proceed to state RECEIVE 94. In state RECEIVE 94, PLS_DATA is set to the same status as RX, PLS_CARRIER is set to carrier_on, and PLS_SIGNAL is set to no_signal_error. If CRS changes to carrier_off, then masking function 90 goes to state INACTIVE 92.

If a collision occurs and the inputs COL and CRS are both true, the masking function 90 will proceed from state INACTIVE 92 or state RECEIVE 94 to state COLLISION 96. In state COLLISION 96, PLS_DATA is set to the same status as RX, PLS_CARRIER is set to carrier_on, and PLS_SIGNAL is set to signal_error.

In addition, the masking function determines whether the preamble and SFD of the signal have been input to the MAC sublayer. The masking function starts a timer when the preamble and SFD have been completed. If the signal on the link ends before the timer ends (so that both inputs COL and CRS become false), the masking function returns to state INACTIVE 92. If the timer expires and the host is still experiencing a collision, then masking function 90 proceeds to state MASKING 98.

In state MASKING 98, PLS_DATA is forced to no_bit_received, PLS_CARRIER is set to carrier_off, and PLS_SIGNAL is set to no_signal_error. In addition, the masking function prevents data bits from being passed to MAC sublayer 26. Masking function returns to state INACTIVE 92 once the signal on the link ends and the inputs CRS and COL are both false.

Referring to FIG. 12, by forcing PLS_CARRIER to carrier_off and PLS_SIGNAL to no_signal_error, the masking function 90 permits MAC sublayer 26 to start the interframe deference timer (step 82) even if there is still an incoming signal on the link.

Referring to FIG. 15, there is shown a collision time line for a network 10 including hosts 12a and 12b which have implemented collision handling rules 28 and a repeater 18a positioned at the midpoint of the signal path therebetween. FIG. 15 shows the event timing if host 12b begins to transmit its signal just before it receives the signal from host 12a.

Network 10 improves efficiency by allowing hosts 12a–12j and repeaters 18a–18d to transmit even if they are receiving incoming signals. This is permitted because the device at the other end of the link will have stopped transmitting the collision fragment by the time the signal from the host or repeater arrives. Because the port does not transmit the collision fragment to the core, the new incoming signal can be sent to the other links without interference.

For example, as shown in FIG. 15, after host 12b has detected a collision and transmitted a jam signal, the masking function 90 (see FIG. 14) will not transmit the incoming signal to its MAC sublayer. Therefore, the MAC sublayer of host 12b may begin its interframe deference timer at time D+96. When the timer expires at time D+192, host 12b may begin transmitting. Although the collision fragment from repeater 18a and the data transmission from host 12b will overlap on link 16b, by the time the signal from host 12b propagates to port 32b, the port will have ceased sending out its jam signal. Consequently, port 32b will change from state SILENT to state ATTENTION and input the signal from link 12b to the core. Even though a collision fragment is arriving at the repeater from host 12a, port 32a has been set to state WAIT so that the collision fragment is not passed to core 30. Therefore, the signal from host 12b may be output without interference on links 16c–16d and 16k to hosts 12c–12d and repeater 18d. In addition, the signal from host 12b will be output on link 16a. Although the signals will overlap on link 12a, by the time the signal from port 32a propagates to host 12a, the host will have ceased transmitting.

In summary, the present invention allows devices, whether interfaces or repeaters, to ignore a portion of an incoming signal following a collision. In particular, under the proper conditions a lower layer of a device (e.g., the port or the physical layer of the interface card) does not pass incoming signals to the next higher layer of the device (e.g., the repeater function or the MAC sublayer) in order to reduce the time wasted on collisions. The device may ignore the incoming signal if it extends beyond the larger of 1) the minimum required fragment length of the IEEE 802.3 CSMA-CD operating rules, i.e., the sum of the preamble, start-frame delimiter, and jamming signal (ninety-six bits), or 2) the minimum required jamming time (thirty-two bits) after a device independently determines that a collision is taking place.

The changes to the operating rules for the repeater may be implemented with or without the changes to the operating rules of the host interface. In addition, although current IEEE 802.3 networks operate asynchronously, i.e., without a centralized time reference to control the transmitters, the present invention may be implemented in a synchronous operating environment.

The internal structure of a network need not match the structure described herein to cause the network to operate as shown in FIGS. 8–10. For example, although the invention has been described as implemented in hardware, it could also be implemented in hardware, firmware or software at other levels. In addition, although the invention has been described in terms of a change to the receiving operation, the invention could be implemented by changes to the transmitting operation. Also, although the invention has been described in terms of a physical layer preventing signals from being transmitted to higher layers, the invention could be implemented by changes to MAC sublayer protocol.

The present invention has been described in terms of a preferred embodiment. The invention, however, is not limited to the embodiment depicted and described. Rather, the scope of the invention is defined by the appended claims.

What is claimed is:

1. A network device, comprising:
    a receiver to receive an incoming signal to a consumer;
    a detector to sense whether the incoming signal is involved in a collision; and
    a filter to mask the presence of the incoming signal from the consumer by truncating the incoming signal, wherein the filter is activated if the detector senses a collision and the incoming signal persists longer than a predetermined duration following the collision.

2. The device of claim 1 wherein the predetermined duration is a first duration if the collision is detected during receipt of a preamble or a start frame delimiter of the incoming signal and is a second duration if the collision is detected after the preamble or the start frame delimiter of the incoming signal.

3. The device of claim 2 wherein the first duration is long enough for receipt of the incoming signal to complete the preamble and the start frame delimiter and for the device to transmit a jamming signal.

4. The device of claim 2 wherein the second duration is long enough for the device to transmit a jamming signal.

5. The device of claim 1 further comprising a transmitter to transmit an outgoing data signal onto a transmission medium, the transmitter being configured to transmit the outgoing data when the filter is masking the incoming signal.

6. The device of claim 1 wherein the device is a repeater.

7. The device of claim 6 wherein the repeater includes a core and a port, and wherein the filter prevents the port from passing incoming signals to the core.

8. The device of claim 1 wherein the device is a network interface.

9. The device of claim 8 further comprising a physical layer and a medium access control (MAC) sublayer, and the filter prevents the physical layer from passing the incoming signal to the MAC sublayer.

10. The device of claim 1 further comprising a jam signal generator to generate a jam signal with a predetermined duration after the detector senses a collision.

11. A method of operating a device in a network, comprising:

receiving an incoming signal from a transmission medium;

passing the incoming signal to a consumer;

detecting whether the incoming signal is involved in a collision; and masking the presence of the incoming signal from the consumer by truncating the incoming signal if a collision is detected and the incoming signal persists longer than a predetermined duration following the collision.

12. The method of claim 11 wherein the predetermined duration is a first duration if the collision is detected during a preamble or a start frame delimiter of the incoming signal and is a second duration if the collision is detected after the preamble or the start frame delimiter of the incoming signal.

13. The method of claim 12 wherein the first duration is long enough for the incoming signal to complete the preamble and the start-frame delimiter and for the device to transmit a jamming signal.

14. The method of claim 12 wherein the second duration is long enough for the device to transmit a jamming signal.

15. The method of claim 11 further comprising the step of transmitting an outgoing data signal onto the transmission medium when the filter is masking the incoming signal.

16. The method of claim 11 wherein the device is a repeater.

17. The method of claim 16 wherein the repeater includes a core and a port, and the masking step prevents the port from passing incoming signals to the core.

18. The method of claim 11 wherein the device is a network interface.

19. The method of claim 18 wherein the network interface includes a physical layer and a medium access control (MAC) sublayer, and the masking step prevents the physical layer from passing the incoming signal to the MAC sublayer.

20. The device of claim 1 further the step of generating a jam signal of a predetermined duration after a collision is detected.

21. A method of operating a repeater including a core and a port to connect a network link to the core, comprising:

a) detecting for a collision;

b) if no collision is detected, transmitting an inbound signal from the port to the core; and c) if a collision is detected,
 i) transmitting a predetermined duration of the inbound signal from the port to the core,
 ii) transmitting a jam signal from the port to the core,
 iii) ignoring the inbound signal and simultaneously starting an interframe deference timer after termination of the lam signal, and
 iv) returning to step (b) if the inbound signal ceases.

22. A network, comprising:

a) a plurality of hosts; and b) a repeater connected to each of the hosts by one point to point link, the repeater including:
 i) port to receive a first incoming signal from the link and pass the first incoming signal to a core,
 ii) a first detector to sense whether the first incoming signal is involved in a collision, and
 iii) a first filter to mask the first incoming signal from the core by truncating the first incoming signal, wherein the first filter is activated if the first detector senses a collision and the first incoming signal persists longer than a predetermined duration following the collision.

23. The network of claim 22 wherein the hosts include i) a physical layer to receive a second incoming signal from the link and pass the second incoming signal to a medium access control sublayer, ii) a second detector to sense whether the second incoming signal is involved in a collision, and iii) a second filter to mask the presence of the second incoming signal from the medium access control sublayer, wherein the second filter is activated if the second detector senses a collision and the second incoming signal persists longer than a predetermined duration following the collision.

24. The device of claim 1 further comprising a timer that is triggered when the detector senses the collision, the expiration of the timer activating the filter if the incoming signal has not ceased.

25. The device of claim 1 wherein the filter is deactivated when the incoming signal ceases.

* * * * *